June 4, 1963
A. S. HART
3,091,855
DISK CUTTER
Filed Aug. 24, 1961
3 Sheets-Sheet 1
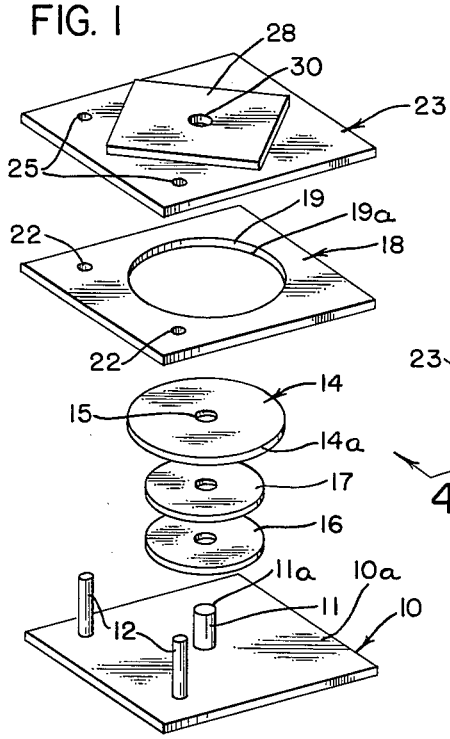
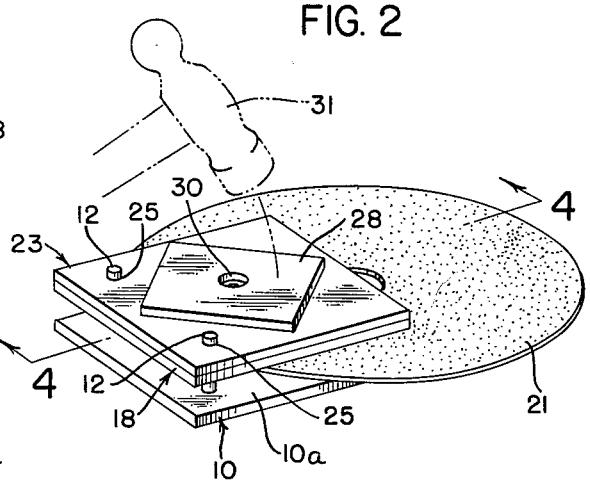
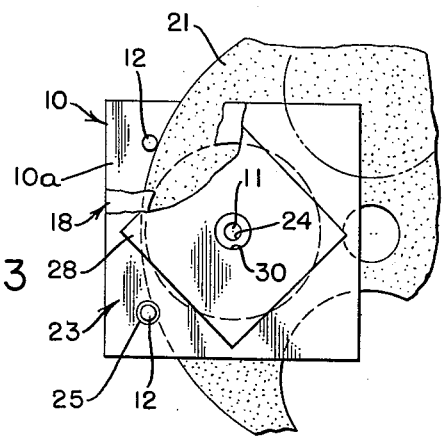
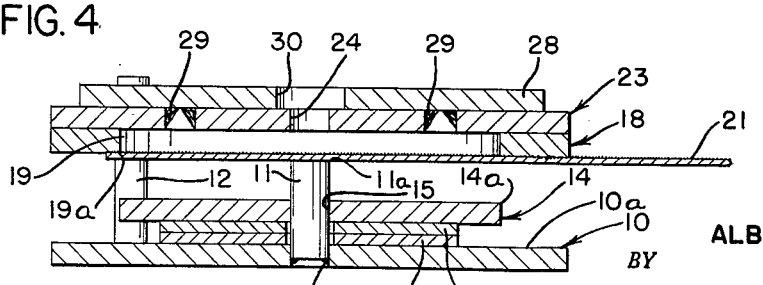
INVENTOR.
ALBERT S. HART
BY *Fay & Fay*
ATTORNEYS June 4, 1963 A. S. HART 3,091,855
DISK CUTTER
Filed Aug. 24, 1961 3 Sheets-Sheet 2
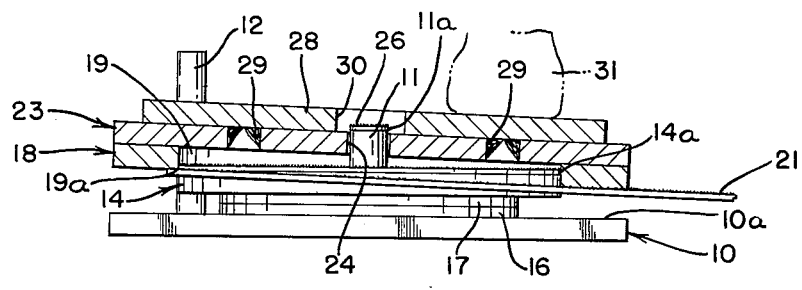
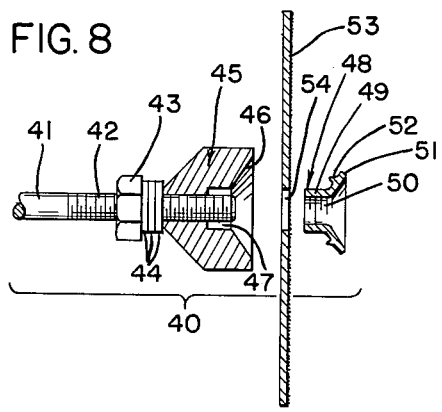
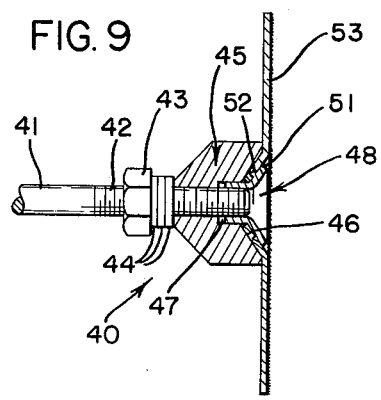
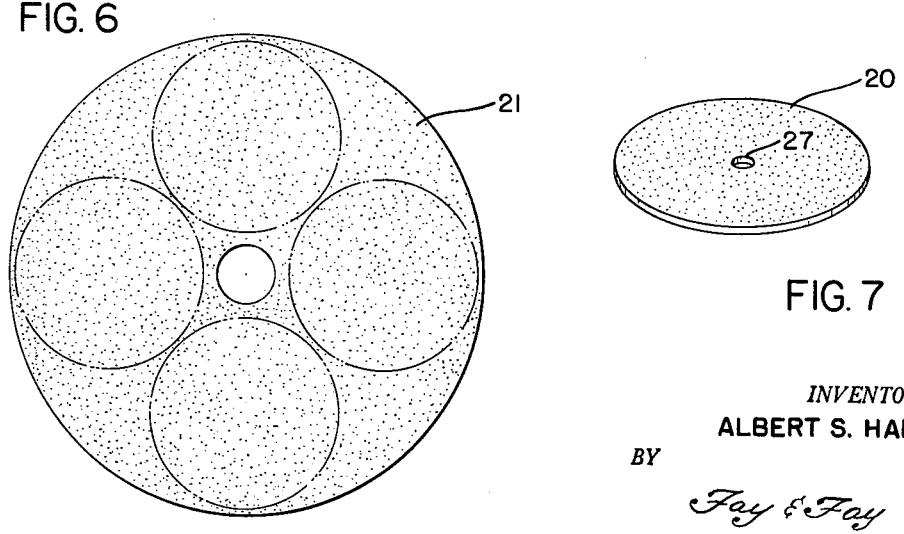
INVENTOR.
ALBERT S. HART
BY
Fay & Fay
ATTORNEYS June 4, 1963  A. S. HART  3,091,855
DISK CUTTER
Filed Aug. 24, 1961  3 Sheets-Sheet 3
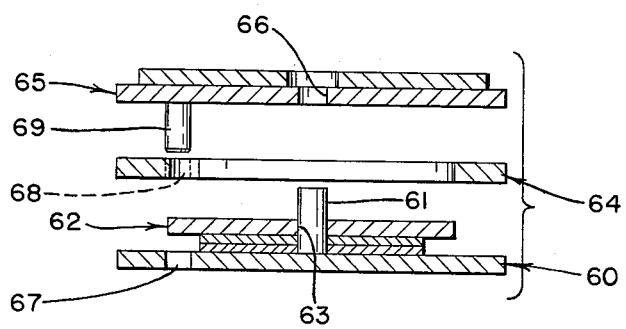
FIG. 10
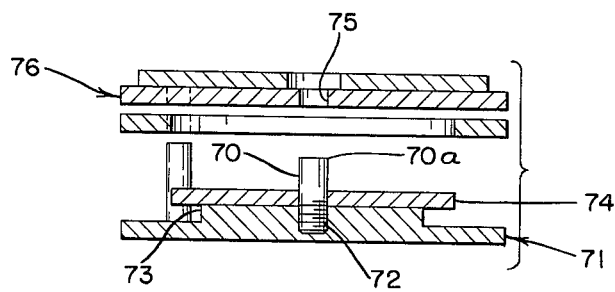
FIG. 11
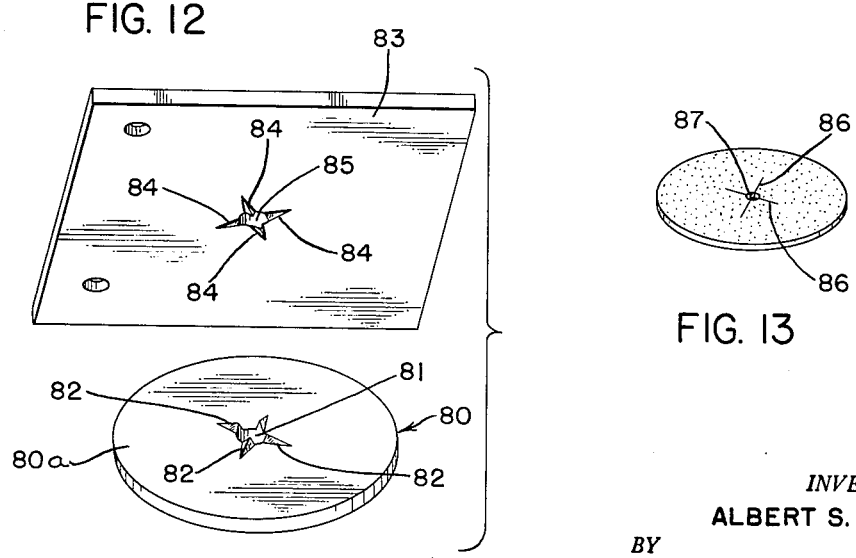
FIG. 12
FIG. 13
*INVENTOR.*
ALBERT S. HART
BY
*Fay & Fay*
ATTORNEYS United States Patent Office 3,091,855
Patented June 4, 1963

3,091,855
DISK CUTTER
Albert S. Hart, Box 242, West Road, Le Roy, Ohio
Filed Aug. 24, 1961, Ser. No. 133,702
11 Claims. (Cl. 30—359)

This invention relates to apparatus for cutting sheet material and more particularly to die cutting apparatus for cutting an apertured disc from sheet material.

An object of this invention is the provision of cutting apparatus comprised of cooperating cutting components adapted to be closed to cut an apertured disc from a sheet of material disposed therebetween.

Another object is to provide cutting apparatus of the character indicated wherein certain of the cutting components can conveniently be mounted and dismounted by hand on a base or support component thereby rendering the apparatus extremely desirable for use in a home work shop or the like.

Another object is the provision of cutting apparatus of the character indicated wherein one of the cutting components is adapted to receive intermittent blows from a shop tool such as a hammer in order to close cooperating cutting components and thereby cut the sheet material.

A further object is the provision of compact cutting apparatus of the character indicated which is economical to produce and highly satisfactory for use on a table or work bench in a work shop for cutting appertured discs from sheets of material such as sandpaper, sandpaper belts, sandpaper discs, and the like.

Still a further object is to provide cutting apparatus of the character indicated wherein the sheet of material is positioned between cooperating cutting components including cooperating disc cutting dies and aperture cutting dies which, when closed, sever or cut an apertured disc from the sheet material.

Another object is to provide cutting apparatus of the character indicated wherein the cutting components are aligned and guided during closing thereof to assure accurate and clean cutting of the sheet material.

Still another object is the provision of cutting apparatus of the character indicated wherein the guide means for the cutting components serve further to facilitate positioning the sheet material transversely of the cutting components.

Other objects in part will be obvious and in part pointed out more fully hereinafter.

In the accompanying drawing representing certain preferred embodiments of the present invention:

FIGURE 1 is a perspective view of the components of the cutting apparatus;

FIGURE 2 is a perspective view of the components in FIGURE 1 assembled for cutting a sheet of material, and illustrating in phantom a hammer for striking one of the cutting components to cut the sheet;

FIGURE 3 is a fragmentary plan view of the cutting apparatus in FIGURE 2 with portions cut away to show the co-operative relationship of the cutting assembly;

FIGURE 4 is a sectional elevation of the cutting apparatus, the section being taken along line 4—4 in FIGURE 2;

FIGURE 5 is a sectional elevation illustrating the cutting apparatus during a cutting operation;

FIGURE 6 is a plan view of a workpiece to be cut by the cutting apparatus and showing, by broken lines, discs to be cut from the sheet;

FIGURE 7 is a perspective view of an apertured disc cut from a workpiece by the cutting apparatus;

FIGURE 8 is a side elevation, partly in section, of the components of an adjustable mounting head for supporting an apertured disc cut by the cutting apparatus;

FIGURE 9 is a side elevation, partly in section, of the mounting head in FIGURE 8, illustrating the components of the mounting head in assembled position and supporting the disc;

FIGURE 10 is an exploded sectional elevation of a modified form of cutting apparatus, still in accordance with the present invention;

FIGURE 11 is an exploded sectional elevation of yet another modified form of cutting apparatus;

FIGURE 12 is an exploded perspective view of modified forms of certain of the cutting components in FIGURE 1; and FIGURE 13 is a perspective view of an apertured disc produced by using the components in FIGURE 12.

As conducive to a clearer understanding of certain features of the present invention, it may be noted at this point that in work shops wherein disc sanding machines of various types and sizes are used, and in home work shops wherein disc sanding devices mountable on hand drills or the like are used, it has long been desired to have a device capable of accurately producing apertured sanding discs from used or semi-used sheets, discs, belts and the like of abrasive material such as sandpaper. In the past, sanding sheets, belts discs and the like have often been discarded after a period of use because they have become torn, partially worn, or no longer possess the abrasive ability needed for a particular job. Thus, a considerable amount of usable sanding material is apt to be discarded for want of a convenient manner to save the usable portions of the material. Further, when a supply of sanding discs in a work shop becomes exhausted, or a particular coarseness of sanding disc is not available, it quite obviously would be advantageous and economical to have means at hand in the shop to produce a disc from available materials such as semi-used or unused sheets of sandpaper, sanding discs, or sanding belts. Heretofore, a person in this situation, short of purchasing new discs, has been compelled to resort to cutting sanding discs using scissors or the like. This manner of producing sanding discs is inconvenient and time consuming, and often results in producing a disc which does not have a truly circular peripheral edge. Thus, in using the disc, the peripheral edge is apt to fray or tear rendering the disc useless or ineffective for further sanding operations. Further, an aperture must be cut in the disc for mounting the disc on a driven mounting head of a sanding device, and if the aperture is not cut with reasonable accuracy or if too large an aperture is cut, the disc may be torn from the mounting head during use of the sanding device or tend to rotate relative to the mounting head. If the aperture is too small, then the disc may tear adjacent the aperture when mounting the disc on the head, thereby weakening the disc adjacent the aperture and rendering the disc more easily torn from the mounting head. Accordingly, it is an outstanding object of the present invention to provide cutting apparatus adapted for hand manipulation whereby it can conveniently be used on a table or work bench in a work shop, which is highly satisfactory for accurately cutting apertured discs from used, semi-used, or unused sanding sheets, belts, discs and the like, which includes a plurality of cutting components adapted to be removably mounted in aligned relationship on a base or support to provide for rapid assembly of the apparatus and accurate cutting of the sheet material, and wherein the cutting components are adapted to be closed by use of a common shop tool such as a hammer.

Referring to the embodiment of the invention illustrated in FIGURES 1 through 7, inclusive, cutting apparatus is provided comprising a base or support member 10 having an upstanding punch 11 thereon and having a pair of guide components 12 spaced from the punch and extending upwardly from the base 10 substantially parallel to the punch. Base member 10 is a substantially flat plate having an upper surface 10a, and punch 11 is disposed centrally of the plate and secured thereto by any suitable means such as by weld 13. Guide components 12 preferably are circular pin elements having a generally smooth outer surface and are secured to base member such as by welding or a threaded connection. A male disc cutting die component 14 in the form of a thin circular disc having a cutting edge 14a is adapted to be removably supported on base 10 and positioned relative thereto by the punch. In this respect male die 14 is provided with an opening 15 disposed substantially centrally thereof for receiving the punch. Spacing means such as discs 16 and 17 may be provided between the male die component and base member in order to selectively space the male die from said base member and relative to the peripheral cutting edge 11a of the punch for the purpose set forth hereinafter. Spacing discs 16 and 17 preferably are apertured discs adapted to be removably mounted on punch 11 and supported on base member 10. The cutting apparatus further includes a female disc cutting die component 18 in the form of a substantially flat plate having an opening 19 defining a cutting edge 19a complementary to cutting edge 14a of the male die component. Female die 18 is adapted upon closing with male die component 14 to cooperate therewith to cut a disc 20 from a sheet of material or workpiece 21 positioned between the components, and the female die is adapted to be removably mounted on guide components 12 for sliding movement therealong relative to male die 14. In this respect, female die 18 is provided with spaced apart apertures 22 adapted to receive guide components 12. The cutting apparatus also includes a punch die 23 adapted to be removably mounted on the guide components. Punch die 23 preferably is in the form of a flat plate having a punch opening 24 complementary to peripheral cutting edge 11a of punch 11. Spaced apart apertures 25 are provided in the punch die for receiving guide components 12 on the base member, whereby punch die 23 is adapted to be mounted on the guide components for sliding movement therealong relative to base plate 10 and punch 11. Punch opening 24 is adapted upon closing with punch 11 to cooperate with cutting edge 11a thereof to cut a slug 26 from workpiece 21, thus providing an aperture 27 in the sheet material disposed substantially centrally of disc 20 cut from the material. The base plate, guide pins, die components and punch components all are produced from metal such as steel, for example, and the die components and punch components preferably are hardened to facilitate maintaining sharp cutting edges thereon.

Punch 11 is of a length sufficient to position cutting edge 11a thereof a short distance above male die 14, which distance is slightly greater than the axial length of punch die opening 24. Therefore, when punch die 23 closes with punch 11 and is advanced into or nearly into contact with male die 14, the punch cutting edge 11a extends completely through punch opening 24 to push slug 26 through the punch opening. Thus, clogging of the punch opening advantageously is prevented. Spacing discs 16 and 17, mentioned above, serve to insure that cutting edge 11a of punch 11 will extend completely through punch opening 24. In this respect, the punch cutting edge after a period of use becomes dull and must be sharpened, such as by grinding. Sharpening of the punch causes the cutting edge thereof to be positioned closer to male die 14, which die limits the advancement of punch 23 toward base member 10. Thus, when punch 11 is made shorter the cutting edge thereof may not be spaced from male die 14 a distance sufficient to insure that the cutting edge will pass completely through punch opening 24 when the punch die is advanced into engagement with the male die. Thus, the male die initially is spaced from base plate 10 by discs 16 and 17, whereby the distance between the male die and the cutting edge of punch 11 can be selectively increased by removing one or more of the spacing discs. Thus, it is possible to adjust male die 14 when punch 11 is shortened in order to insure that the cutting edge of the shortened punch will extend completely through punch opening 24. Too, it will be understood that any number of spacing discs can be provided between the male die and base member and that the discs may be of varying thicknesses.

Punch die 23 is provided with a reinforcing or strike plate 28, which plate is secured to the punch die such as by plug welds 29. Strike plate 28 includes an opening 30 axially aligned with punch opening 24 but somewhat larger than the diameter of the punch opening, the purpose of which strike plate opening is set forth more fully hereinafter.

Guide components or pins 12 serve to align female die 18 with male die 14 to insure proper alignment of their respective cutting edges 19a and 14a when the dies are closed. Similarly, guide pins 12 serve to align punch die 23 and punch 11 to insure proper alignment of the punch opening 24 and punch cutting edge 11a upon closing of the punch die and punch. The guide components further serve advantageously to position workpiece 21 transversely of the die components prior to a cutting operation, as illustrated in FIGURE 3. In this respect, workpiece 21 can quickly be positioned for cutting by sliding the workpiece transversely of guide pins 12 and into abutment therewith. By positioning the workpiece against the guide pins and on punch 11, as illustrated in FIGURE 4, the workpiece is steadied, thus insuring that disc 20 will be cut from a desired portion of the workpiece.

To assemble the above-described cutting apparatus to perform a cutting operation, spacing discs 16 and 17 and male die component 14 are mounted on base member 10, as illustrated in FIGURE 4, and workpiece 21 is positioned above the cutting edge of punch 11 and against guide components 12. The female die component 18 is then mounted on guide pins 12 by passing the guide pins through corresponding apertures 22 therein, and punch die 23 is positioned over female die component 18 in a similar manner. The workpiece is then cut by advancing female die component 18 and punch die 23 toward base 10 whereby aperture 27 is first cut in the material of the workpiece and then disc 20 is cut from the material. A highly satisfactory method of closing the die components and the punch and punch die is by intermittently striking reinforcing or strike plate 28 on the punch die such as by a hammer 31. The strike plate protects the punch die from the effects of the blows of the hammer, such as, for example, bending or denting of the punch die, or marring of the punch opening. Strike plate opening 30 is larger than the diameter of punch opening 24 to insure release and to facilitate removal of slug 26 cut from the material by the punch when the punch passes through the punch opening. Preferably, punch 11 does not extend clear through the strike plate opening 30 when punch plate 23 is advanced into engagement with male die 14, therefore, the strike plate can be struck directly over opening 30 therein without danger of damaging the cutting edge of the punch.

To perform the disc cutting operation after aperture 27 is cut in the sheet material, it is advantageous to strike the reinforcing plate intermittently along a circular path corresponding to the periphery of cutting edge 14a of male die component 14. This mode of operation provides for the sheet material to be progressively cut about the periphery of the male die component, as illustrated in FIGURE 5, thus preventing jamming of the material between the cutting edges of the discs and producing a clean cut of the disc from the material. After the disc is cut from the material, punch die 23 and female die component 18 are removed from guide pins 12. If the cut disc remains on the male die component, it is easily removed either by moving the cut disc upwardly past the cutting edge of the punch or by removing the male die component from about the punch whereby the cut disc is carried therewith. The latter method of removing the disc advantageously protects the cut disc from being bent during removal from the punch. Should the cut disc be retained by the female die component when the latter is withdrawn from the guide pins, the disc easily can be removed therefrom since the female die component is open on both sides.

The cutting apparatus advantageously can be used to cut a number of apertured discs from new, used, or semi-used sheets, discs, or the like of sandpaper. Further, various sizes of discs can be cut simply by using different sizes of disc cutting components. Thus, for example, workpiece 21 in the form of a disc of sandpaper, can be cut into a number of smaller apertured discs such as disc 20. These cut discs, depending on the diameter thereof, can be used in conjunction with portable sanding apparatus such as a sanding attachment for an electric drill, or smaller hand-operated power tools used for finishing curved surfaces or small areas not accessible by larger sanding equipment. In either instance, the apertured discs are adapted to be mounted on a rotating tool by means of a mounting head such as the mounting head assembly 40 illustrated in FIGURES 8 and 9 of the drawing. Mounting head 40 provides an adjustable support for small sanding discs of varying thickness. The mounting head includes a rod 41 threaded at its outer end 42 to receive a positioning nut 43, a plurality of washers or spacing discs 44 and a substantially conical head element 45. The head element includes a recessed portion 46 which terminates in a peripheral recess 47 surrounding the adjacent end of rod 41. The peripheral recess is of a size to receive the neck 49 of a fastening nut 48, which fastening nut is hollow and is provided with internal threads 50 for attachment of the nut to the rod. The outer end 51 of nut 48 is flared outwardly and provided with barbs 52 for penetrating a sandpaper disc 53 adjacent the aperture 54 therein for preventing rotation of the disc relative to head 45. By adjusting the position of head 45 along rod 41 the sandpaper holder can be adjusted to support sandpaper discs of varying thicknesses and in a manner whereby, regardless of the thickness of the sandpaper, the end of the rod will not project beyond the head and into contact with a surface to be sanded.

In the embodiment illustrated in FIGURE 10 of the drawing, cutting apparatus is provided having components similar to the components of the cutting apparatus described hereinbefore with regard to FIGURES 1 to 5, inclusive. In this respect, the apparatus in FIGURE 10 includes a base plate or support 60 having an upstanding punch 61 thereon. Base plate 60 removably supports a male disc cutting die component 62 having an aperture 63 through which the punch extends. Further, a female disc cutting die component 64 is provided for cooperation with male die component 62 to cut a disc from a sheet of material disposed therebetween, and a punch die 65 is provided having an opening 66 complementary to the punch for cooperation upon closing therewith to cut an aperture in the disc. In this instance, however, base plate 60 and female disc cutting component 64 are provided with guide apertures 67 and 68 respectively, and punch die 65 is provided with guide components 69 in the form of pins which cooperate with guide openings 67 and 68 to align the disc cutting components and the punch and punch opening. A cutting operation in this instance would be performed by mounting female die component 64 on the guide pins 69 by inserting the pins through the openings 68, passing guide pins 69 through openings 67 in the base plate, positioning the material to be cut between the cutting edge of the punch and the female die component and laterally against the guide pins, and then advancing female die 64 and punch die 65 towards base plate 60 to close the male and female die components and the punch and punch opening.

Another embodiment of the cutting apparatus is illustrated in FIGURE 11. The apparatus is comprised of components similar to the apparatus discussed in conjunction with FIGURES 1 through 5, inclusive; however, in this instance a punch pin 70 is removably mounted on a base plate 71 such as by threaded connection 72, and spacing means in the form of a projection 73 integral with base 71 is provided for spacing a male disc cutting die component 74 relative to the punch. Punch 70 can be removed from base 71 for sharpening, such as by grinding, and the spacing projection 73 can be ground to reduce the distance between male die 74 and base plate 71, thus insuring that cutting edge 70a of punch 70 will project through punch opening 75 in a punch plate 76 when the latter is advanced into contact with male die 74, whereby a slug cut from material positioned between the punch and punch die will be pushed through the punch opening.

In FIGURE 12 there is illustrated a modified form of male die and punch die components adapted to be used in conjunction with the apparatus of the present invention. In this regard, a male disc cutting die 80 having an opening 81 therein for receiving the punch component of the apparatus is provided on one surface 80a with a plurality of substantially equally spaced cutting projections 82, which cutting projections extend substantially radially from the opening. The adjacent surface of the punch die 83 is provided with a plurality of cooperating cutting grooves 84 positioned adjacent the punch opening 85 therein and extending substantially radially therefrom. Grooves 84 are adapted to receive cutting projections 82 on the male die component when the male die component and punch die are brought together during a disc cutting operation. The cutting projections and grooves cooperate to produce radially extending cut lines 86 adjacent the aperture 87 cut in the disc, as illustrated in FIGURE 13. The cut lines provides for the marginal edge of the disc adjacent the aperture to be flared axially of the aperture without causing any substantial bending or warping of the disc when the latter is fastened on a mounting head. In this respect, when an apertured disc is fastened to a mounting head using a flaring fastening nut and complementary head element such as nut 48 and head 45 in FIGURES 8 and 9, the marginal edge of the disc adjacent the aperture is forced to conform to the flaring contour of the nut and head. If the disc is very thick it is apt to be stiff and not easily subject to bending. Thus, the disc may tear, buckle, or take a warped appearance when fastened on the mounting head unless the material of the disc adjacent the aperture is free to flex relative to the plane of the disc. The cut lines 86 provided in a disc by using the components in FIGURE 12 serve to render the material of the disc sufficiently flexible to conform to the flaring contour of a mounting head substantially without tearing or distortion of the disc. Cutting projections 82, of course, can be provided on the punch die and the grooves 84 can be provided on the male die.

Although considerable emphasis has been placed herein on the fact that the punch, disc cutting die components and punch die are separate components, it is to be understood that the punch and the male die component may be an integral unit and that the female die component and the punch die similarily may be an integral unit. Too, the positions of the male and female die components relative to the base can be reversed by making minor changes in the configurations of the dies. Further, the guide means may be other than the pins and cooperating apertures described herein and could, for example, be in the form of a simple square or rectangular post which by itself would align the various components of the apparatus during a cutting operation. Still further, the base or support member may, for example, be the upper surface of a table or the like instead of being a plate member adapted to rest or be fastened to a table or work bench.

As many possible embodiments of the invention may be made and as many possible changes may be made in the embodiments herein set forth, it will be distinctly understood that all matter described herein is to be interpreted as illustrative and not as a limitation.

I claim:

1. Apparatus for cutting an apertured disc from sheet material, comprising a base member, an upstanding punch on said base member, a male die having an opening for receiving said punch whereby said male die is adapted to be removably mounted on said base member and positioned thereon by said punch, a female die adapted to be advanced toward said base member for cooperation with said male die upon closing therewith to cut a disc from a sheet of material positioned therebetween, a punch die adapted to be advanced toward said base member and having a punch opening for receiving said punch and cooperating upon closing therewith to cut an aperture in said sheet material at a position substantially centrally of said disc, guide components on said base member, and guide apertures in said female die and in said punch die for receiving said guide components whereby said female die and said punch die are adapted to be removably mounted on said guide components, said guide apertures cooperating with said guide components to align said female die with said male die and said punch opening with said punch during closing thereof.

2. Apparatus of the character indicated in claim 1, wherein the opposed surfaces of said punch die and said male die are provided with cooperating cutting projections and grooves positioned adjacent the punch opening in said punch die and the opening in said male die and extending substantially radially therefrom for cutting said sheet material along lines extending substantially radially from said aperture cut by said punch and said punch opening.

3. Apparatus of the character indicated in claim 1, and means for spacing said male die from said base member.

4. Apparatus of the character indicated in claim 3, wherein said spacing means comprises a plurality of removable disc elements surrounding said punch.

5. Apparatus for cutting an apertured disc from sheet material, comprising a base member, an upstanding punch on said base member, a male die having an opening for receiving said punch whereby said male die is adapted to be removably mounted on said base member and positioned thereon by said punch, means for selectively spacing said male die from said base member, a female die adapted to be advanced toward said base member for cooperation with said male die upon closing therewith to cut a disc from sheet material positioned therebetween, a punch die adapted to be advanced toward said base member and having a punch opening for receiving said punch and cooperating upon closing therewith to cut an aperture in said sheet material at a position substantially centrally of said disc, cooperating cutting projections and grooves on the opposed surfaces of said male die and said punch die and positioned adjacent said punch opening in the punch die and said opening in the male die and extending substantially radially from said openings for cutting said sheet material along lines extending substantially radially from said aperture cut by the punch and punch opening, guide components on said base member, and guide apertures in said female die and in said punch die for cooperation with said guide components to align said female die with said male die and said punch die with said punch during closing thereof.

6. Apparatus of the character indicated in claim 5, wherein said spacing means includes at least one removable disc element surrounding said punch between said male die and said base plate.

7. Apparatus for cutting an apertured disc from sheet material, comprising a base plate, an upstanding punch on said base plate, a male die having an opening for receiving said punch whereby said male die is adapted to be removably mounted on said base plate and positioned thereon by said punch, said punch extending through said opening in said male die and terminating in a cutting edge spaced from the male die, guide pins on said base plate spaced from said punch and substantially parallel thereto, a female die comprising a substantially flat plate having guide apertures for receiving said guide pins whereby said female die is adapted to be removably mounted on said guide pins for movement therealong toward said male die, said female die having a die opening complementary to said male die and adapted to close therewith to cut a disc from sheet material positioned therebetween, said male die and said female die opening being aligned by said guide pins and the guide apertures in the female die, a punch die comprising a substantially flat plate having guide apertures for receiving said guide pins whereby said punch die is adapted to be removably mounted on said guide pins for movement therealong toward said punch, said punch die having a punch opening complementary to said cutting edge of the punch and adapted to close therewith to cut an aperture in said disc, said punch and said punch opening being aligned by said guide pins and said guide apertures in the punch die, and a reinforcing plate on said punch die adapted to be struck to close said male and female dies and said punch and punch die to cut said sheet material, said reinforcing plate having an opening therethrough in alignment with said punch opening and adapted to receive said punch when said punch and punch die are closed.

8. Apparatus of the character indicated in claim 7, and removable spacing elements surrounding said punch between said base plate and said male die for spacing said male die from the base plate.

9. Apparatus of the character indicated in claim 8, wherein the opposed surfaces of said male die and said punch die are provided with cooperating cutting projections and grooves positioned adjacent said male die opening and said punch opening and extending substantially radially therefrom, said projections and grooves upon closing cooperating to cut said sheet material adjacent said aperture cut therein by said punch and punch opening.

10. Apparatus for cutting an apertured disc from sheet material, comprising a support, an upstanding punch on said support, a first disc cutting die component having an opening for receiving said punch whereby said die component is adapted to be removably mounted on said support and positioned thereon by said punch, a second disc cutting die component, said first and second die components having complementary cutting edges and being adapted upon closing to cut a disc from a sheet of material positioned therebetween, a punch die having a punch opening for receiving said punch and adapted upon closing with the punch to cut an aperture in said sheet material substantially centrally of said disc, and means spaced from said punch for aligning said first and second die components and said punch die opening and punch during closing thereof, said aligning means including guide pins on said punch die and cooperating guide apertures in said support and in said second disc cutting die component.

11. Apparatus for cutting an apertured disc from sheet material, comprising a support, an upstanding punch on said support, a first disc cutting die component having an opening for receiving said punch whereby said die component is adapted to be removably mounted on said support and positioned thereon by said punch, a second disc cutting die component, said first and second die components having complementary cutting edges and being adapted upon closing to cut a disc from a sheet of material positioned therebetween, a punch die having a punch opening for receiving said punch and adapted upon closing with the punch to cut an aperture in said sheet material substantially centrally of said disc, and means spaced from said punch for aligning said first and second die components and said punch die opening and punch during closing thereof, said aligning means including guide pins on said support and cooperating guide apertures in said second disc cutting die component and in said punch die.

References Cited in the file of this patent

UNITED STATES PATENTS

| | | |
|---|---|---|
| 1,308,178 | Kasel | July 1, 1919 |
| 2,145,725 | Jamieson | Jan. 31, 1939 |
| 2,768,560 | Hirson | Oct. 30, 1956 |
| 2,850,096 | Berlin et al. | Sept. 2, 1958 |